US012205525B2

(12) United States Patent
Mi et al.

(10) Patent No.: US 12,205,525 B2
(45) Date of Patent: Jan. 21, 2025

(54) DISPLAY PANEL AND DISPLAY DEVICE

(71) Applicant: HEFEI VISIONOX TECHNOLOGY CO., LTD., Anhui (CN)

(72) Inventors: Lei Mi, Hefei (CN); Hongqing Feng, Hefei (CN); Jianjun Lu, Hefei (CN)

(73) Assignee: HEFEI VISIONOX TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 17/990,067

(22) Filed: Nov. 18, 2022

(65) Prior Publication Data

US 2023/0401992 A1 Dec. 14, 2023

Related U.S. Application Data

(63) Continuation of application No. PCT/CN2021/120985, filed on Sep. 27, 2021.

(30) Foreign Application Priority Data

Dec. 18, 2020 (CN) ........................ 202011504869.1

(51) Int. Cl.
*G09G 3/32* (2016.01)

(52) U.S. Cl.
CPC ....... *G09G 3/32* (2013.01); *G09G 2310/0267* (2013.01); *G09G 2310/08* (2013.01)

(58) Field of Classification Search
CPC ... G09G 3/30–3291; G09G 2310/0267; G09G 2310/08
See application file for complete search history.

(56) References Cited

U.S. PATENT DOCUMENTS

2007/0194319 A1* 8/2007 An ...................... G02F 1/13452 349/143
2011/0109596 A1 5/2011 Yoon
(Continued)

FOREIGN PATENT DOCUMENTS

CN 107610635 A 1/2018
CN 107885001 A 4/2018
(Continued)

OTHER PUBLICATIONS

International Search Report and Written Opinion issued on Dec. 17, 2021, in corresponding International Application No. PCT/CN2021/120985, 14 pages.
(Continued)

*Primary Examiner* — Hang Lin
(74) *Attorney, Agent, or Firm* — Maier & Maier, PLLC

(57) ABSTRACT

A display panel and a display device. The display panel includes a first display region, a second display region, and a non-display region, where transmittance of the first display region is higher than transmittance of the second display region; at least one first display unit disposed in the first display region, at least one first gate drive circuit disposed in the non-display region and at least one first pixel circuits disposed in the non-display region, where the at least one first pixel circuit is connected to the at least one first display unit and configured to provide a drive current for the at least one first display unit, and the at least one first gate drive circuit is connected to the at least one first pixel circuit and configured to provide a drive signal for the at least one first pixel circuit.

20 Claims, 9 Drawing Sheets

(56) References Cited

U.S. PATENT DOCUMENTS

| | | | | |
|---|---|---|---|---|
| 2012/0044240 | A1* | 2/2012 | Chung | G09G 3/3233 345/76 |
| 2017/0179439 | A1* | 6/2017 | Tian | H01L 29/78633 |
| 2020/0342799 | A1 | 10/2020 | Yang et al. | |
| 2021/0407424 | A1* | 12/2021 | Long | G09G 3/3266 |
| 2022/0366832 | A1* | 11/2022 | Bae | G09G 3/2007 |

FOREIGN PATENT DOCUMENTS

| | | | |
|---|---|---|---|
| CN | 207217536 | U | 4/2018 |
| CN | 108364967 | A | 8/2018 |
| CN | 108389879 | A | 8/2018 |
| CN | 108682372 | A | 10/2018 |
| CN | 110189706 | A | 8/2019 |
| CN | 110232892 | A | 9/2019 |
| CN | 110288945 | A | 9/2019 |
| CN | 110767157 | A | 2/2020 |
| CN | 110767717 | A | 2/2020 |
| CN | 111381386 | A | 7/2020 |
| CN | 111402741 | A | 7/2020 |
| CN | 111668278 | A | 9/2020 |
| CN | 111833812 | A | 10/2020 |
| CN | 111834397 | A | 10/2020 |
| CN | 111885230 | A | 11/2020 |
| CN | 111969010 | A | 11/2020 |
| CN | 112002742 | A | 11/2020 |
| CN | 112466244 | A | 3/2021 |
| TW | 201730871 | A | 9/2017 |
| WO | 2016104340 | A1 | 6/2016 |
| WO | 2018008720 | A1 | 1/2018 |
| WO | 2020155555 | A1 | 8/2020 |

OTHER PUBLICATIONS

Office Action issued on Jan. 6, 2021, in corresponding Chinese Application No. 202011504869.1, 18 pages.

Office Action issued on Mar. 10, 2022, in corresponding Chinese Application No. 202011504869.1, 19 pages.

* cited by examiner

DISPLAY PANEL AND DISPLAY DEVICE

CROSS-REFERENCE TO RELATED APPLICATION(S)

This application is a continuation of the international patent application No. PCT/CN2021/120985 filed on Sep. 27, 2021, which claims priority to Chinese Patent Application No. 202011504869.1 filed with the China National Intellectual Property Administration (CNIPA) on Dec. 18, 2020, the disclosures of which are incorporated herein by reference in their entireties.

TECHNICAL FIELD

Embodiments of the present application relate to the field of display technologies and, in particular, to a display panel and a display device.

BACKGROUND

At present, the display panel is developed towards a full screen. In the full screen, a light-transmissive region with relatively higher transmittance needs to be disposed in a display region and is used for placing structures such as a camera. In this case, pixel circuits in the light-transmissive region may be disposed in the peripheral region of the light-transmissive region, thereby ensuring the transmittance of the light-transmissive region. When the pixel circuits are disposed in the peripheral region of the light-transmissive region, the pixels per inch (PPI) in the light-transmissive region may be reduced so that the number of pixel circuits disposed in the peripheral region is reduced, thereby reducing the area occupied by the peripheral region. In this way, the PPI in the light-transmissive region is different from the PPI in the display region, which adversely affect the display effect of the display panel.

SUMMARY

The present application provides a display panel and a display device to improve the display effect of the display panel.

In a first aspect, embodiments of the present application provide a display panel including a first display region, a second display region, and a non-display region, where transmittance of the first display region is higher than transmittance of the second display region.

The display panel also includes at least one first display unit disposed in the first display region, at least one first gate drive circuit disposed in the non-display region and at least one first pixel circuit disposed in the non-display region, where the at least one first pixel circuit is connected to the at least one first display unit and configured to provide a drive current for the at least one first display unit, and the at least one first gate drive circuit is connected to the at least one first pixel circuit and configured to provide a drive signal for the at least one first pixel circuit.

In a second aspect, embodiments of the present application further provide a display device including the display panel provided in any embodiment of the present application.

According to technical solutions in the embodiments of the present disclosure, the first pixel circuit and the first gate drive circuit are disposed in the non-display region, the first pixel circuit is connected to the first display unit in the first display region, and the first gate drive circuit is connected to the first pixel circuit. Since the first pixel circuit is disposed in the non-display region, the case can be avoided where the first pixel circuit is placed in a transition region additionally disposed between the first display region and the second display region. In addition, the number of first display units in the first display region can be set according to requirements so that the first display region and the second display region can have the display effect as same as possible, improving the overall display effect of the display panel. Moreover, the first pixel circuit may be disposed in a blank region of the non-display region so that the first pixel circuit can be prevented from being disposed in the same region as other circuit structures, reducing the complexity of a circuit structure on the display panel. In addition, the first gate drive circuit can independently control the first pixel circuit to drive the first display unit to emit light, reducing the requirement of the display panel for a drive capability and reducing the cost of the display panel.

DETAILED DESCRIPTION

Figure 1:
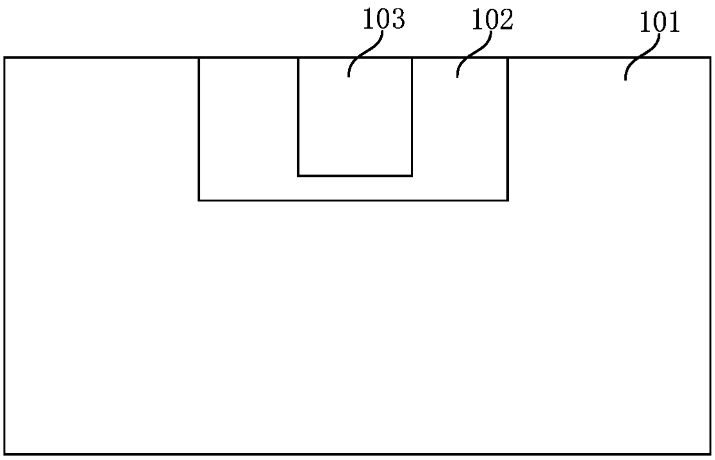
FIG. 1 is a schematic diagram of a display panel in the related art.

The present application is further described in detail below in conjunction with the drawings and the embodiments. It is to be understood that the embodiments described herein are only intended to illustrate and not to limit the present application. Additionally, it is to be noted that for ease of description, only part, not all, of structures related to the present application are illustrated in the drawings.

FIG. 1 is a schematic diagram of a display panel in the related art. As shown in FIG. 1, the display panel includes a display region 101, a transition region 102, and a light-transmissive region 103, where the transition region 102 is disposed at least partially around the light-transmissive region 103, the display region 101 is disposed at least partially around the transition region 102, and the light-transmissive region 103 has relatively higher transmittance and may be a region for placing a camera. When the display panel is a full screen, a light-emitting element is disposed in the light-transmissive region 103 and a pixel circuit is disposed in the transition region 102, where the light-emitting element in the light-transmissive region 103 is driven via the pixel circuit in the transition region 102 to emit light. When a relatively large number of light-emitting elements are disposed in the light-transmissive region 103, a relatively large number of pixel circuits corresponding to the light-emitting elements are disposed in the transition region 102, which causes a complicated structure and a relatively large area occupied by the transition region 102. In this case, the light-emitting elements in the light-transmissive region 103 may be reduced, that is, the PPI in the light-transmissive region 103 is reduced, for example, the PPI in the light-transmissive region 103 may be set to be half or three-quarters of the PPI in the display region 101, which can reduce the area occupied by the transition region 102 and the circuit design complexity of the transition region 102. However, the difference between the PPI in the light-transmissive region 103 and the PPI in the display region 101 lead to different display effects in the different regions when the display panel is the full screen, adversely affecting the overall display effect of the display panel.

Figure 2:
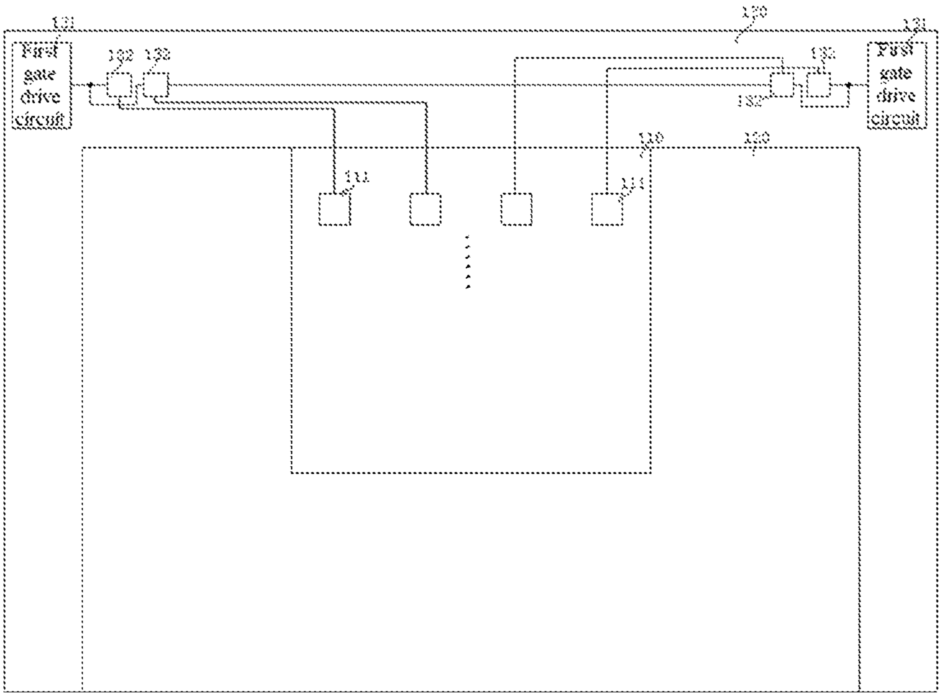
FIG. 2 is a schematic diagram of a display panel according to an embodiment of the present application.

The embodiments of the present application provide a display panel. FIG. 2 is a schematic diagram of a display panel according to an embodiment of the present application. As shown in FIG. 2, the display panel includes a first display region 110, a second display region 120, and a non-display region 130, where the transmittance of the first display region 110 is higher than the transmittance of the second display region 120. The display panel includes at least one first display unit 111 disposed in the first display region 110, and at least one first gate drive circuit 131 and at least one first pixel circuit 132 both disposed in the non-display region 130. The at least one first pixel circuit 132 is connected to the at least one first display units 111 and configured to provide a drive current for the at least one first display units 111, and the at least one first gate drive circuit 131 are connected to the at least one first pixel circuit 132 and configured to provide a drive signal for the at least one first pixel circuit 132.

In some embodiments, the first display region 110 has relatively higher transmittance and may be used as a photosensitive region of the display panel, for example, a region where a camera is disposed. The shape of the first display region 110 is not limited, and it is exemplarily shown in FIG. 2 that the first display region 110 is a square region. In other embodiments, the first display region 110 may be circular, waterdrop-shaped, U-shaped, or the like. The second display region 120 may be a normal display region of the display panel, and the non-display region 130 may be disposed around the first display region 110 and the second display region 120, for example, the non-display region 130 may be a bezel region of the display panel. The first display unit 111 may be a light-emitting element including a first electrode, a light-emitting layer, and a second electrode which are stacked. The first pixel circuit 132 may be any form of pixel circuit such as a pixel circuit of seven-transistor and one-capacitor (7T1C). Each first pixel circuit 132 is connected to a respective first display unit 111 such that the first pixel circuit 132 provides the drive current for the first display unit 111 to drive the first display unit 111 to emit light. The non-display region 130 has a relatively large space. When the first pixel circuit 132 is disposed in the non-display region 130, the case can be avoided where the first pixel circuit 132 is placed in a transition region additionally disposed between the first display region 110 and the second display region 120. In addition, the number of first display units 111 in the first display region 110 can be set according to requirements. For example, the PPI of the first display region 110 can be set to be the same as the PPI of the second display region 120 and is not restricted by the second display region 120. Thus, the first display region 110 and the second display region 120 have the display effect as same as possible, improving the overall display effect of the display panel. Moreover, the first pixel circuit 132 may be disposed in a blank region of the non-display region 130 so that the first pixel circuit 132 can be prevented from being disposed in the same region as other circuit structures, reducing the complexity of a circuit structure on the display panel. In addition, the first gate drive circuit 131 is further disposed in the non-display region 130 and may provide the drive signal for the first pixel circuit 132 to drive the first pixel circuit 132 to work such as that the drive current is formed to drive the first display unit 111 to emit light. The first gate drive circuit 131 can independently control the first pixel circuit 132 to drive the first display unit 111 in the first display region 110 to emit light, which can reduce the requirement of the display panel for a drive capability and is conducive to reducing the cost of the display panel.

It is to be noted that it is exemplarily shown in FIG. 2 that the first display region 110 is disposed in an intermediate position of the second display region 120 along a row direction. First gate drive circuits 131 may be disposed on two sides of the display panel along the row direction to drive the at least one first pixel circuit 132 from two sides. In other embodiments, the at least one first gate drive circuit 131 may be disposed only on one side of the display panel along the row direction to drive the at least one first pixel circuit 132 from one side.

Figure 3:
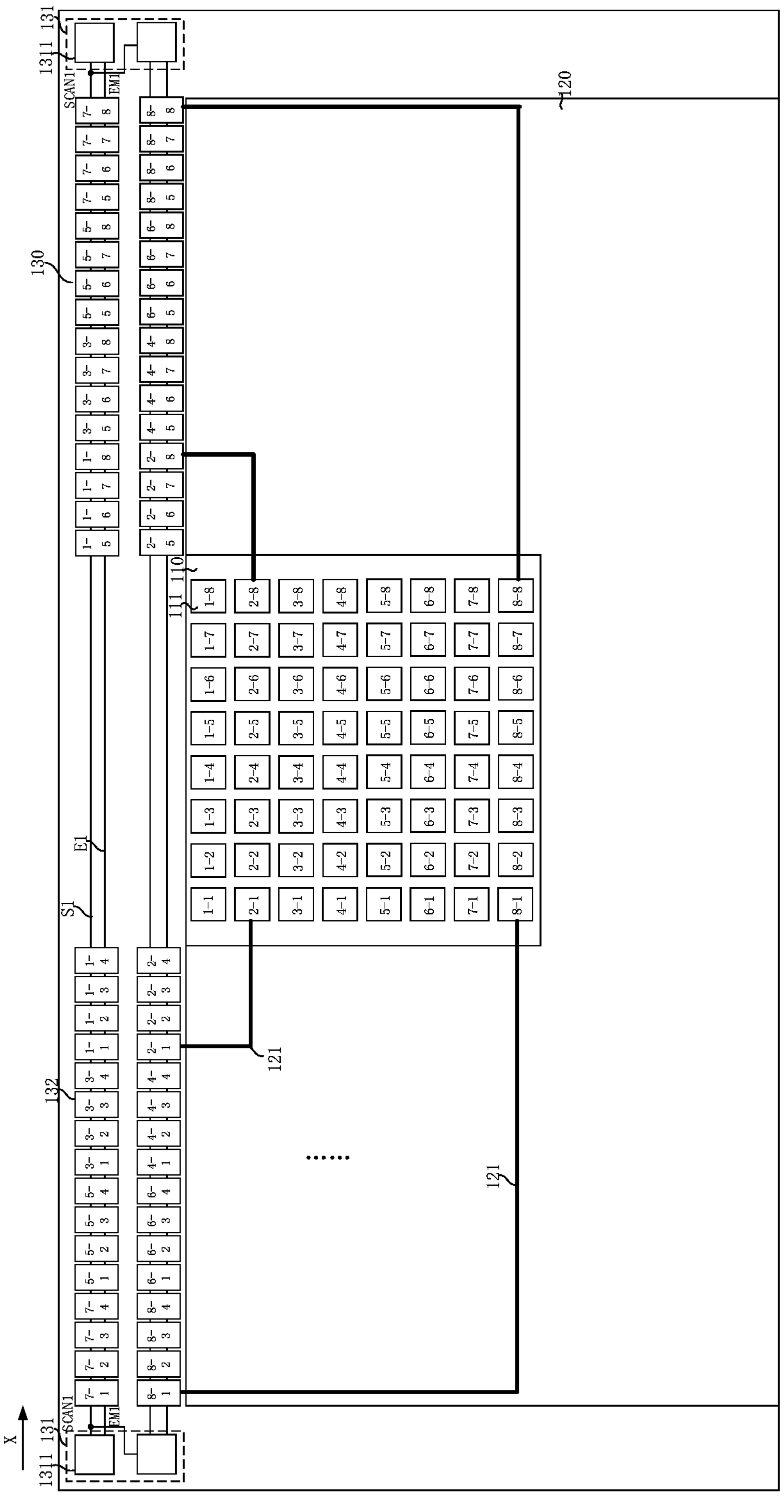
FIG. 3 is another schematic diagram of a display panel according to an embodiment of the present application.

FIG. 3 is another schematic diagram of a display panel according to an embodiment of the present application. As shown in FIG. 3, at least one first display unit 111 is disposed in the first display region 110, multiple first pixel circuits 132 are disposed in the non-display region 130, and multiple transparent conductive lines 121 are disposed in the second display region 120, where the multiple first display units 111 are correspondingly connected to the multiple first pixel circuits 132 via the transparent conductive lines 121.

In some embodiments, the first display units 111 may be light-emitting elements, the first pixel circuits 132 may be connected to the anodes of the light-emitting elements via the transparent conductive lines 121 to provide the drive current for the light-emitting elements. The transparent conductive lines 121 are disposed in the second display region 120 so that when the first pixel circuits 132 are connected to the first display units 111, wound wires can be prevented. The transparent conductive lines 121 has relatively higher transmittance, and when the transparent conductive lines 121 are connected to the anodes of the light-emitting elements, part of the transparent conductive lines 121 in the first display region 110 can be prevented from lowering the transmittance of the first display region 110, ensuring the transmittance of the first display region 110.

It is to be noted that when the transparent conductive lines 121 are disposed in the second display region 120, the transparent conductive lines 121 are insulated from other conductive structures in the second display region 120 so that signal crosstalk can be avoided. For example, a transparent conductive line layer may be disposed separately and the transparent conductive lines 121 are formed in the transparent conductive line layer, and an insulating layer may be disposed for insulating a film where the transparent conductive lines 121 are disposed from a film where the other conductive structures are disposed.

Based on the preceding embodiments, first pixel circuits are arranged in n rows and each first gate drive circuit includes n first gate driving units which are cascaded. A first scan signal output terminal of each first gate driving unit is connected to first scan signal input terminals of first pixel circuits in a same row via a first scan signal line to provide a first scan signal for the first pixel circuits in the same row. A first light emission control signal output terminal of each first gate driving unit is connected to first light emission control signal input terminals of first pixel circuits in at least one row via a first light emission control signal line to provide a first light emission control signal for the first pixel circuits in the at least one row. Herein, n is an integer greater than or equal to 1.

In some embodiments, the first pixel circuits may be arranged in one row or in multiple rows, which may be adaptively adjusted according to the dimension of the space of the non-display region 130. When the first pixel circuits are disposed in one row, each first gate drive circuit may include one first gate driving unit, where each first gate driving unit includes a first scan signal output terminal SCAN1 and a first light emission control signal output terminal EM1. The first scan signal output terminal SCAN1 is connected to first scan signal input terminals of the first pixel circuits in the one row via a first scan signal line 51 to provide a scan signal for the first pixel circuits in the one row. In addition, the first light emission control signal output terminal EM1 is connected to the first light emission control signal input terminals of the first pixel circuits in the one row via a first light emission control signal line E1 to provide a light emission control signal for the first pixel circuits in the one row so that the at least one first pixel circuit can normally drive the at least one first display units 111 to emit light. When the first pixel circuits are arranged in n rows, each first gate drive circuit may include n first gate driving units, and each first gate driving unit further includes a start signal input terminal (not shown in FIG. 3) to provide a start signal for the first gate driving unit. In this case, a first scan signal output terminal SCAN1 of an i-th first gate driving unit is connected to a start signal input terminal of an (i+1)-th first gate driving unit, and the (i+1)-th first gate driving unit is started by a first scan signal output by the i-th first gate driving unit such that the first gate driving units are cascaded and the n first gate driving units output first scan signals one by one. The first scan signal output terminal SCAN1 of the i-th first gate driving unit is connected to first scan signal input terminals of first pixel circuits in a respective i-th row to provide the scan signal for the first pixel circuits in the i-th row, and a first light emission control signal output terminal EM1 of the i-th first gate driving unit may be connected to first light emission control signal input terminals of the first pixel circuits in the i-th row to provide the light emission control signal for the first pixel circuits in the i-th row so that the first pixel circuits in the i-th row can normally drive the first display units to emit light. Here, i is an integer greater than or equal to 1 and less than or equal to n. Since the scan signals provided by first scan signal output terminals SCAN1 of then first gate driving units are sequentially output, the first pixel circuits in the n rows sequentially control, according to the scan signals and light emission control signals, the first display units 111 correspondingly connected to the first pixel circuits in the n rows to emit light.

For example, with continued reference to FIG. 3, 8 rows and 8 columns of first display units 111 are disposed in the first display region 110, that is, 64 first display units 111 are provided in total. When the first gate drive circuits 131 drive from two sides, one first gate drive circuit 131 may be separately disposed on each of the two sides of the non-display region 130 along a row direction X, and the first pixel circuits 132 on each of the two sides of the first display region 110 are connected to first gate drive circuits 131 on the same side of the first pixel circuits 132 along the row direction X. It is exemplarily shown in FIG. 3 that the first pixel circuits 132 are disposed in two rows and 64 first display units 111 correspond to 64 first pixel circuits 132. When two rows of first pixel circuits 132 are disposed on each side, it may be set that each row of first pixel circuits 132 on each side include 16 first pixel circuits 132. For example, each of the 8 rows and 8 columns of the first display units 111 in the first display region 110 is a j-k-th first display unit 111 separately, where the j-k-th first display unit 111 refers to a first display unit 111 in a j-th row and a k-th column, j is any integer from 1 to 8, and k is any integer from 1 to 8. Two rows of first pixel circuits 132 on one side are connected to adjacent 4 columns of first display units. The 4 columns of first display units 111, which are located at odd-th rows, are connected to one of the two rows of first pixel circuits 132 on the one side, and 4 columns of first display units 111, which are located at even-th rows, are connected to the other one of the two rows of first pixel circuits 132 on the one side. Two rows of first pixel circuits 132 on the other side are connected to adjacent 4 columns of first display units. The 4 columns of first display units 111, which are located at odd-th rows, are connected to one of the two rows of first pixel circuits 132 on the other side, and the 4 columns of first display units 111, which are located at even-th rows, are connected to the other one of the two rows of first pixel circuits 132 on the other side. Moreover, the 4 columns of first display units 111 on both of the two sides, which are located at odd-th rows, are in the same row, and the 4 columns of first display units 111 in all the 8 columns on both of the two sides, which are located at even-th rows, are in the same row. In this case, each first gate drive circuit 131 may include two first gate driving units 1311. A first scan signal output terminal SCAN1 of a first one of first gate driving units 1311 is connected to first scan signal input terminals of first pixel circuits 132 in a first row to provide the scan signal for the first pixel circuits 132 in the first row such that data signals are written into the first pixel circuits 132 in the first row. A first light emission control signal output terminal EM1 of the first one of the first gate driving units 1311 is connected to first light emission control signal input terminals of the first pixel circuits 132 in the first row to provide the light emission control signal for the first pixel circuits 132 in the first row. The first pixel circuits 132 in the first row control first display units 111 connected thereto to emit light according to the written data signals, that is, the first display units 111 in the odd-th rows in the first display region 110 may emit light. Similarly, a first scan signal output terminal SCAN1 of a second one of the first gate driving units 1311 is connected to first scan signal input terminals of the first pixel circuits 132 in a second row to provide the scan signal for the first pixel circuits 132 in the second row such that the data signals are written into the first pixel circuits 132 in the second row. A first light emission control signal output terminal EM1 of the second one of the first gate driving units 1311 is connected to first light emission control signal input terminals of the first pixel circuits 132 in the second row to provide the light emission control signal for the first pixel circuits 132 in the second row. The first pixel circuits 132 in the second row control first display units 111 connected thereto to emit light according to the written data signals, that is, the first display units 111 in the even-th rows in the first display region 110 may emit light. As can be seen, the two first gate driving units 1311 may independently control all the first display units 111 in the first display region 110 to emit light, which can reduce the requirement of the display panel for the drive capability and is conducive to reducing the cost of the display panel.

It is to be noted that in the preceding embodiments, each first display unit 111 may include multiple light-emitting elements such as a red light-emitting element, a green light-emitting element, and a blue light-emitting element. Each corresponding first pixel circuit 132 may include multiple sub-pixel-circuits such as a red sub-pixel-circuit correspondingly connected to the red light-emitting element, a green sub-pixel-circuit correspondingly connected to the green light-emitting element, and a blue sub-pixel-circuit correspondingly connected to the blue light-emitting element. For each of the sub-pixel-circuits, a first scan signal input terminal of a sub-pixel-circuit is connected to the first scan signal output terminal SCAN1 of a respective first gate driving unit 1311 connected to the sub-pixel-circuit, and a first light emission control signal input terminal of the sub-pixel-circuit is connected to the first light emission control signal output terminal EM1 of the respective first gate driving unit 1311 connected to the sub-pixel-circuit, such that the sub-pixel-circuit is driven.

Figure 4:
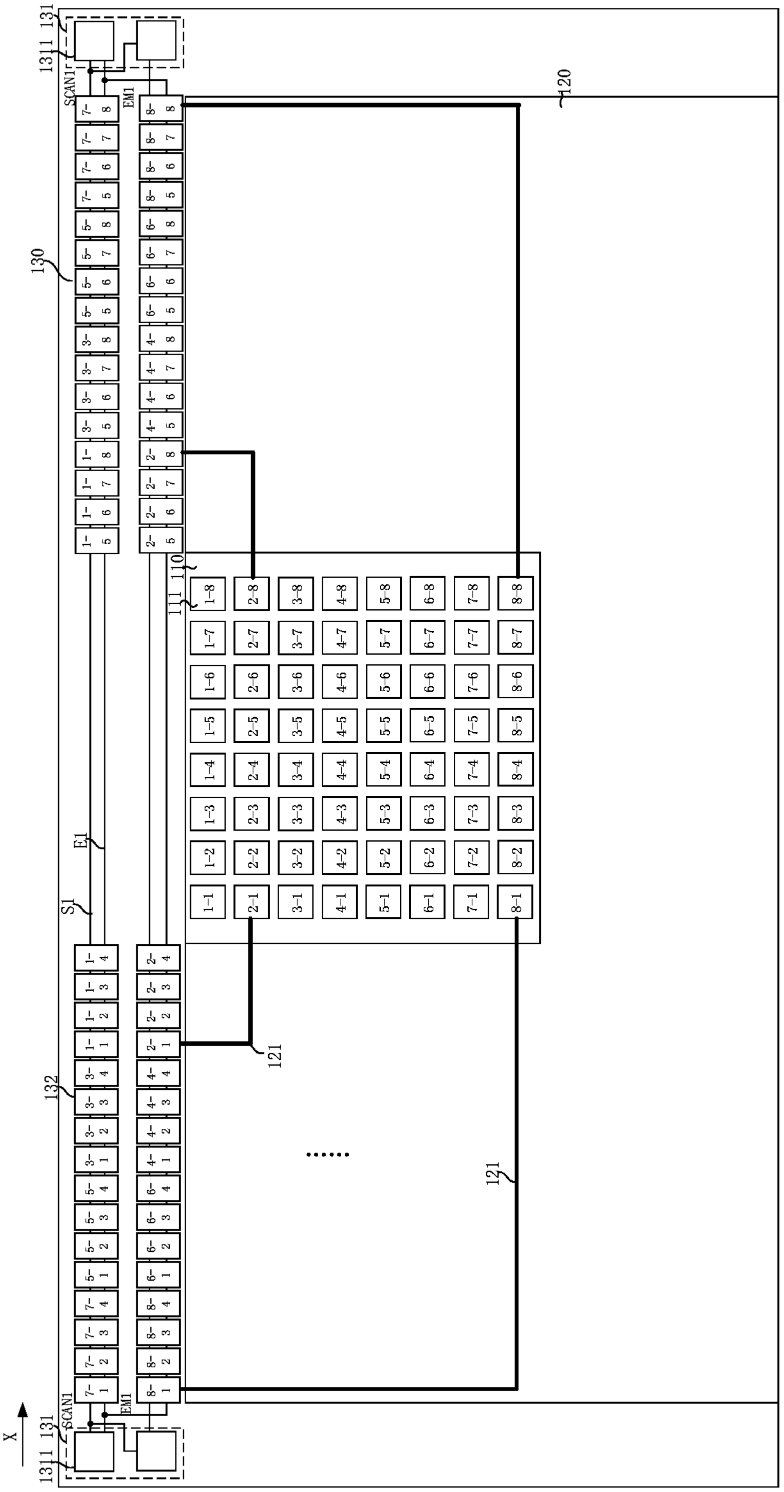
FIG. 4 is another schematic diagram of a display panel according to an embodiment of the present application.

In addition, it is exemplarily shown in FIG. 3 that a first light emission control signal output terminal EM1 of each first gate driving unit 1311 is connected to the first light emission control signal input terminals of the row of first pixel circuits 132 corresponding to the a first gate driving unit 1311, that is, the first light emission control signal provided from the first light emission control signal output terminal EM1 of each first gate driving unit 1311 drives only first pixel circuits 132 in one row. In this case, first display units 111 in the odd-th row and first display units 111 in the even-th row in the first display region 110 sequentially emit light. In other embodiments, the first light emission control signal output terminal EM1 of the first gate driving unit 1311 may be connected to first light emission control signal input terminals of the first pixel circuits 132 in multiple rows such that the first pixel circuits 132 in the multiple rows may be driven by the first light emission control signal. For example, FIG. 4 is another schematic diagram of a display panel according to an embodiment of the present application. As shown in FIG. 4, the first pixel units 132 in two rows are disposed in the non-display region 130, and the first gate drive circuit includes two first gate driving units 1311, where the first light emission control signal output terminal EM1 of the first one of the two first gate driving units 1311 is connected to the first light emission control signal input terminals of the first pixel circuits 132 in the first row and the first light emission control signal input terminals of the first pixel circuits 132 in the second row to provide the light emission control signal for the first pixel circuits 132 in the two rows. In this case, all the first display units 111 in the first display region 110 emit light simultaneously.

Figure 5:
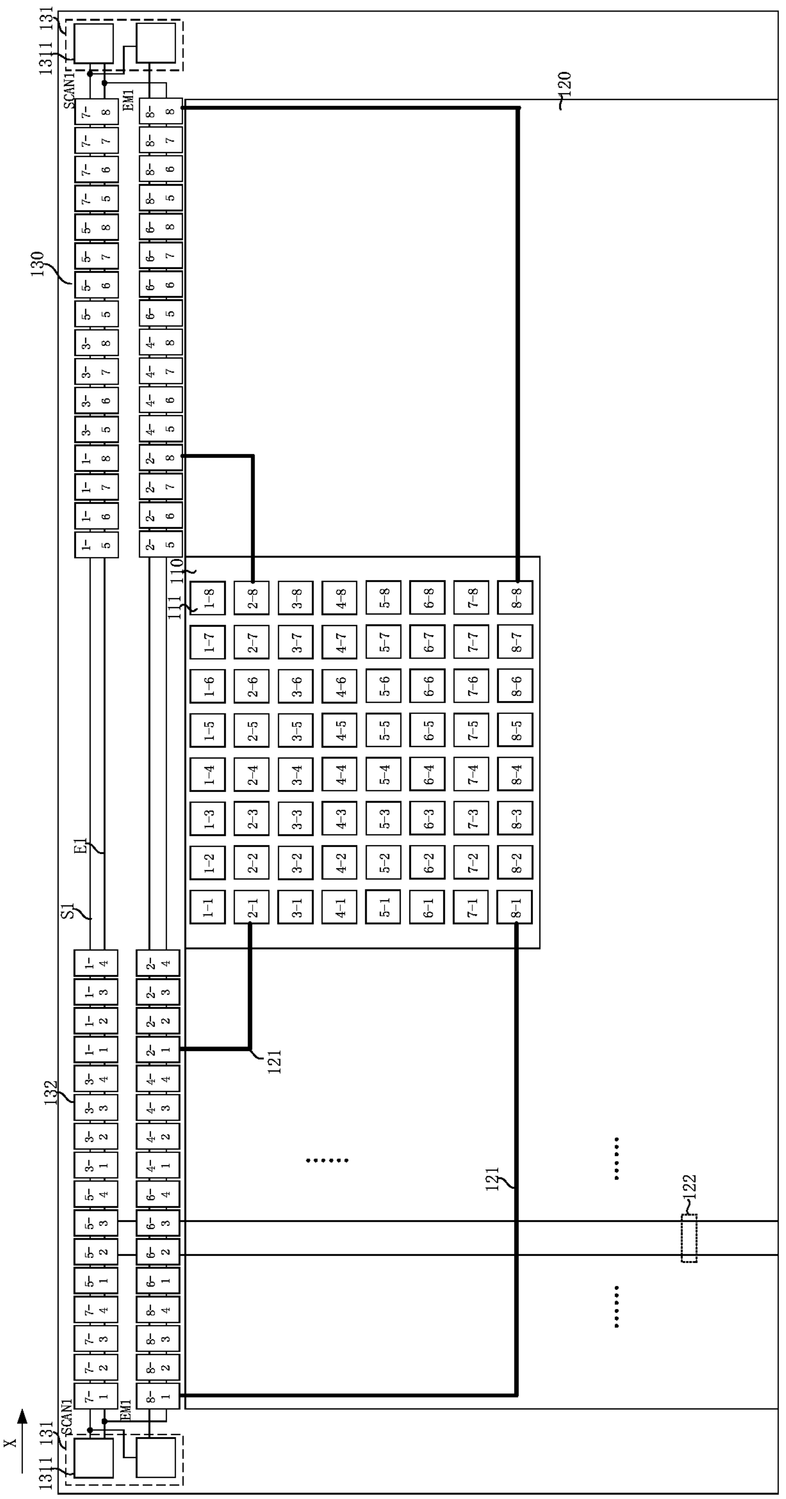
FIG. 5 is another schematic diagram of a display panel according to an embodiment of the present application.

FIG. 5 is another schematic diagram of a display panel according to an embodiment of the present application. As shown in FIG. 5, the display panel further includes at least one first data signal line 122 connected to first pixel circuits 132 in a column to provide a data signal for the first pixel circuits 132 in the column.

In some embodiments, each first pixel circuit 132 includes a first data signal input terminal, when the first scan signal provided by the first scan signal input terminal of the first pixel circuit 132 is an effective level, a data signal provided by the first data signal line 122 is written into the first pixel circuit 132 via the first data signal input terminal, and in a light emission stage, the first pixel circuit 132 drives, according to the data signal, the first display unit 111 to emit light. In addition, when each first pixel circuit 132 includes the multiple sub-pixel-circuits, each column of sub-pixel-circuits separately correspond to one first data signal line 122 so that different data signals can be written into different sub-pixel-circuits. Thus, the light-emitting elements corresponding to the different sub-pixel-circuits emit light of different grayscales according to the data signals. For example, referring to FIGS. 3 and 5, when two rows of first pixel circuits 132 are disposed on each side, the first pixel circuits 132 in each row are in 16 columns, and each first pixel circuit 132 includes three sub-pixel-circuits, each first pixel circuit 132 needs three first data signal lines 122 separately connected to each sub-pixel-circuit such that the data signal is provided for the sub-pixel-circuit, and the first pixel circuits 132 on each side need 48 first data signal lines 122.

Figure 6:
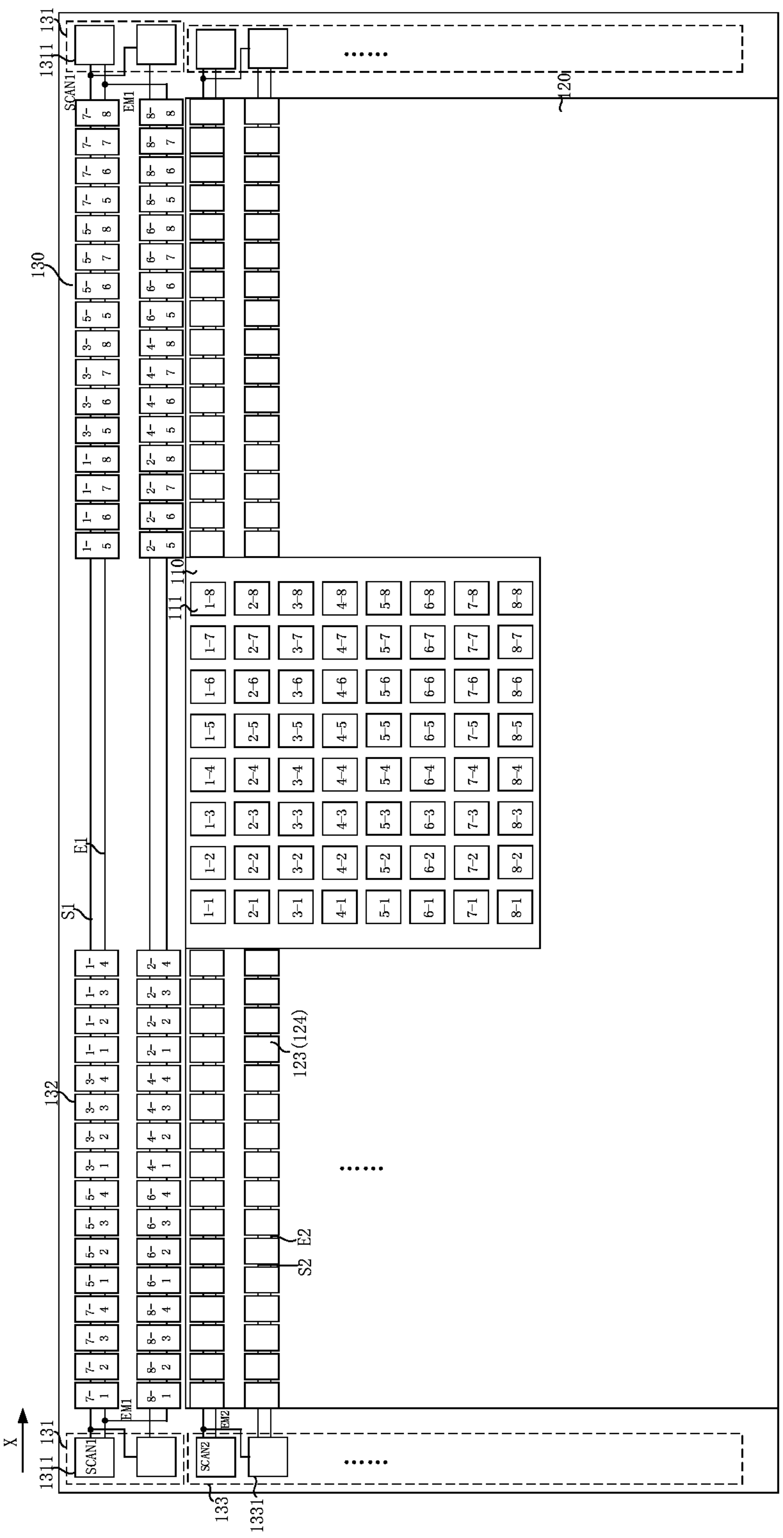
FIG. 6 is another schematic diagram of a display panel according to an embodiment of the present application.

FIG. 6 is another schematic diagram of a display panel according to an embodiment of the present application. As shown in FIG. 6, second display units 123 and second pixel circuits 124 are disposed in the second display region 120, and second gate drive circuits 133 are further disposed in the non-display region 130, where the second pixel circuits 124 are connected to the second display units 123 and configured to provide a drive current for the second display units 123, and the second gate drive circuits 133 are connected to the second pixel circuits 124 and configured to provide a drive signal for the second pixel circuits 124.

In some embodiments, the second display region 120 may be a normal display region of the display panel, that is, the second display region 120 includes pixel units in multiple rows and multiple columns, and each pixel unit includes at least one second display unit 123 and at least one second pixel circuit 124. A pixel circuit layer is disposed in the second display region 120 and used for forming the at least one second pixel circuit 124, and at least one light-emitting element is disposed on the pixel circuit layer as the at least one second display unit 123. When the second display unit 123 is a light-emitting element, each second display unit 123 may include a first electrode, a light-emitting layer, and a second electrode which are laminated. The second display unit 123 may include one light-emitting element or multiple light-emitting elements, and correspondingly, the second pixel circuit 124 may include one sub-pixel-circuit or multiple sub-pixel-circuits, where each sub-pixel-circuit is connected to a respective light-emitting element. The second gate drive circuit 133 is disposed in the non-display region 130 and connected to the second pixel circuit 124 via a second scan signal line S2 and a second light emission control signal line E2 to provide a scan signal and a light emission control signal for the second pixel circuit 124 such that the second pixel circuit 124 is controlled to generate a drive current according to a data signal to drive the second display unit 123 to emit light. In this case, the first gate drive circuit 131 independently controls the first pixel circuit 132 to drive the first display unit 111 to emit light, and the second gate drive circuit 133 independently controls the second pixel circuit 124 to drive the second display unit 123 to emit light, which can reduce the requirement of the display panel for the drive capability and is conducive to reducing the cost of the display panel.

It is to be noted that the first pixel circuit 132 and the second pixel circuit 124 may have the same specific pixel circuit structure or different specific pixel circuit structures. In this embodiment, the first pixel circuit 132 and the second pixel circuit 124 may be provided with the same pixel circuit structure. For example, the first pixel circuit 132 and the second pixel circuit 124 may be each a 7T1C pixel circuit so that the formation of the first pixel circuit 132 and the second pixel circuit 124 via the same technique in the manufacturing process of the display panel is facilitated, thereby simplifying a manufacturing technique of the display panel. In addition, it is exemplarily shown in FIG. 6 that second gate drive circuits 133 may be disposed on the two sides of the display panel along the row direction to drive the second pixel circuits 124 from two sides. In other embodiments, the second gate drive circuits 133 may be disposed on one side of the display panel along the row direction to drive the second pixel circuits 124 from one side. Preferably, the first gate drive circuit 131 drives the first pixel circuit 132 in a same manner as the second gate drive circuit 133 drives the second pixel circuit 124, which can avoid the display effect difference between the first display region 110 and the second display region 120 due to different driving manners. For example, it may be set that the first gate drive circuits 131 drive the first pixel circuits 132 from two sides and the second gate drive circuits 133 also drive the second pixel circuits 124 from two sides. Thus, on the basis that the display effect difference due to different driving manners is avoided, the drive capability of the first gate drive circuit 131 to the first pixel circuit 132 can be improved and the drive capability of the second gate drive circuit 133 to the second pixel circuit 124 can be improved.

With continued reference to FIG. 6, m rows of second pixel circuits 124 are included and each second gate drive circuit 133 includes m second gate driving units 1331 which are cascaded; a second scan signal output terminal SCAN2 of each second gate driving unit 1331 is connected to second scan signal input terminals of second pixel circuits 124 in a same row via the second scan signal line S2 to provide a second scan signal for the second pixel circuits 124 in the same row; and a second light emission control signal output terminal EM2 of each second gate driving unit 1331 is connected to second light emission control signal input terminals of second pixel circuits 124 in at least one row via the second light emission control signal line E2 to provide a second light emission control signal for the second pixel circuits 124 in the at least one row. A timing of the effective level of the first scan signal is ahead of a timing of the effective level of the second scan signal, and m is an integer greater than or equal to 1.

When m rows of second pixel circuits are disposed, each second gate drive circuit may include m second gate driving units, and each second gate driving unit further includes a start signal input terminal to provide a start signal for the second gate driving unit. In this case, a second scan signal output terminal SCAN2 of an i-th second gate driving unit is connected to a start signal input terminal of an (i+1)-th second gate driving unit, and the (i+1)-th second gate driving unit is started by a second scan signal output by the i-th second gate driving unit such that the second gate driving units are cascaded and the m second gate driving units output second scan signals one by one, where i is an integer greater than or equal to 1 and less than or equal to m−1. In some embodiments, each second gate driving unit 1331 is connected to respective second pixel circuits 124, that is, a second scan signal output terminal SCAN2 of a p-th second gate driving unit 1331 is connected to second scan signal input terminals of second pixel circuits 124 in a p-th row to provide the scan signal for the second pixel circuits 124 in the p-th row such that data signals are written into the second pixel circuits 124 in the p-th row. A second light emission control signal output terminal EM2 of the p-th second gate driving unit 1331 may be connected to second light emission control signal input terminals of the second pixel circuits 124 in the p-th row to provide the light emission control signal for the second pixel circuits 124 in the p-th row such that the second pixel circuits 124 in the p-th row may drive, according to the data signals, second display units 123 connected thereto to emit light. Here, p is an integer greater than or equal to 1 and less than or equal to m. When the cascaded second gate driving units 1331 sequentially output scan signals and light emission control signals, the second display units 123 in the second display region 120 emit light row by row for displaying. In addition, the timing of the effective level of the first scan signal is ahead of the timing of the effective level of the second scan signal so that the first display units 111 in the first display region 110 and the second display units 123 in the second display region 120 can be driven to emit light at different times.

Figure 7:
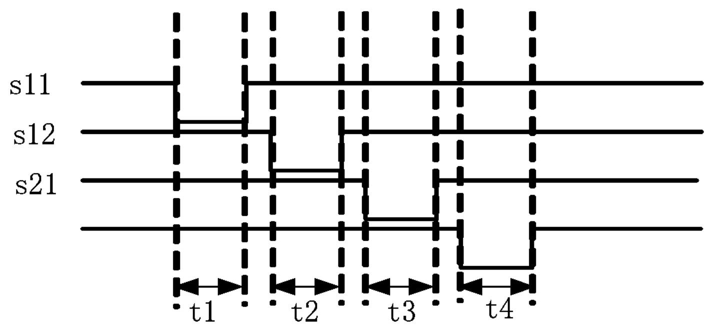
FIG. 7 is a timing diagram of the display panel provided in FIG. 6.

For example, when transistors in the first pixel circuit 132 and the second pixel circuit 124 are P-type transistors, the effective level of the first scan signal and the effective level of the second scan signal are low levels. FIG. 7 is a timing diagram of the display panel provided in FIG. 6, where s11 is a timing diagram of the first scan signal provided by the first one of the first gate driving units, s12 is a timing diagram of the first scan signal provided by the second one of the first gate driving units, s21 is a timing diagram of the second scan signal provided by the first one of the second gate driving units, and s22 is a timing diagram of the second scan signal provided by a second one of the second gate driving units. A working process of the display panel is described below in conjunction with FIGS. 6 and 7.

In a first stage t1, s11 is a low level, the first one of the first gate driving units provides an effective scan signal for the first row of first pixel circuits, the data signals are written into the first row of first pixel circuits, and when the first light emission control signal is the effective level, the first row of first pixel circuits drive, according to the data signals, the first display units connected thereto to emit light.

In a second stage t2, s12 is the low level, the second one of the first gate driving units provides the effective scan signal for the second row of first pixel circuits, the data signals are written into the second row of first pixel circuits, and when the first light emission control signal is the effective level, the second row of first pixel circuits drive, according to the data signals, the first display units connected thereto to emit light.

In a third stage t3, s21 is the low level, the first one of the second gate driving units provides the effective scan signal for a first row of second pixel circuits, the data signals are written into the first row of second pixel circuits, and when the second light emission control signal is the effective level, the first row of second pixel circuits drive, according to the data signals, second display units connected thereto to emit light, where the data signals for the first pixel circuits are different from the data signals for the second pixel circuits.

In a fourth stage t4, s22 is the low level, the second one of the second gate driving units provides the effective scan signal for a second row of second pixel circuits, the data signals are written into the second row of second pixel circuits, and when the second light emission control signal is the effective level, the second row of second pixel circuits drive, according to the data signals, second display units connected thereto to emit light.

In a subsequent stage of a frame, the cascaded second gate driving units sequentially provide effective scan signals for the second pixel circuits correspondingly connected to the cascaded second gate driving units such that the data signals are written into the second pixel circuits row by row and then the second display units are controlled by second light emission control signals to emit light.

It is to be noted that first light emission control signal for each row of first pixel circuits may be effective level row by row and all the rows of the first display units do not emit light simultaneously, or the first light emission control signals for each row of first pixel circuits may be effective level simultaneously, and all the rows of first display units emit light simultaneously. Similarly, the second light emission control signal for each row of second pixel circuits may be effective level row by row and all the rows of the second display units emit light row by row, or the second light emission control signal for each of multiple rows of second pixel circuits may be effective level simultaneously, and the second display units in all the multiple rows emit light simultaneously.

Figure 8:
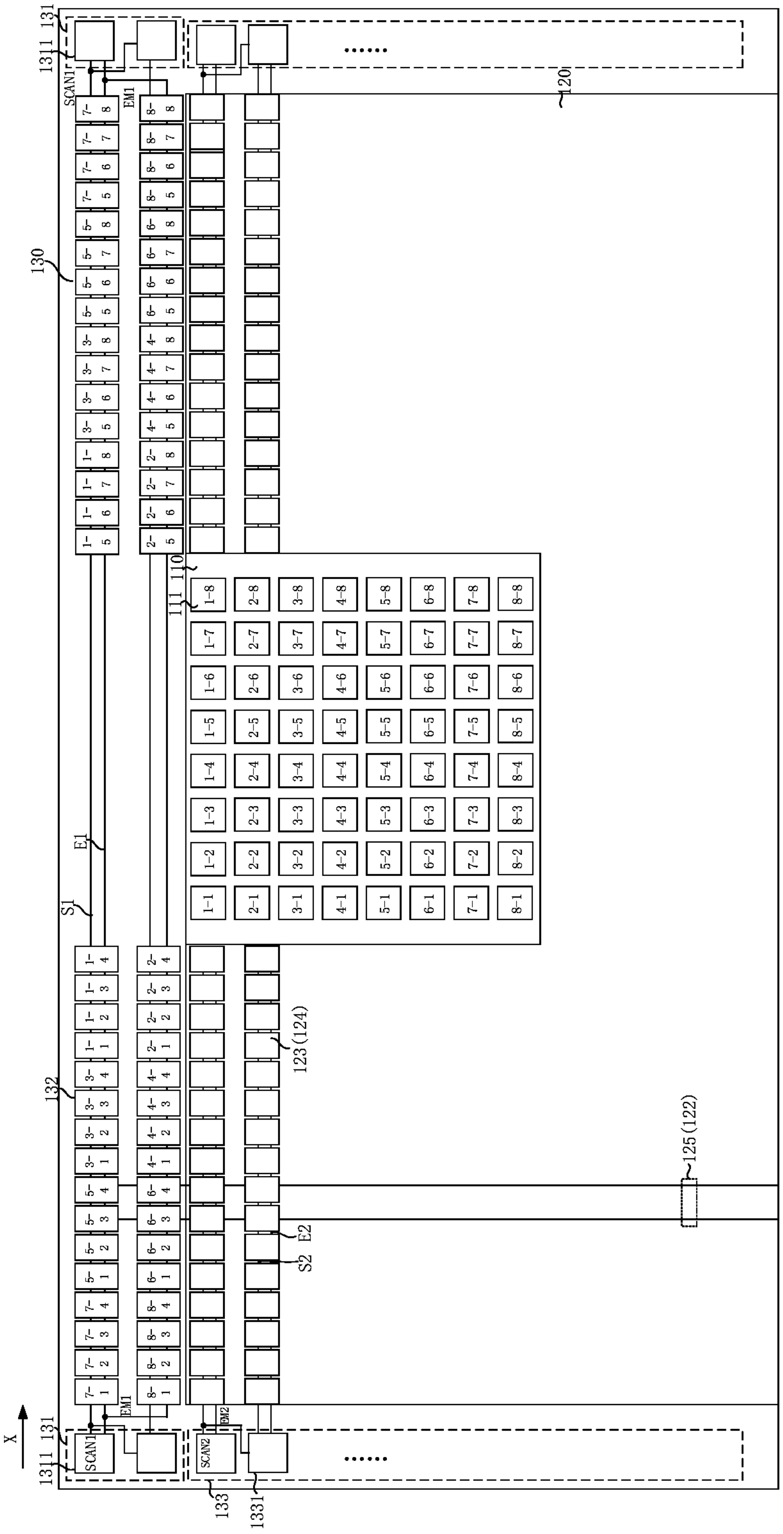
FIG. 8 is another schematic diagram of a display panel according to an embodiment of the present application.

FIG. 8 is another schematic diagram of a display panel according to an embodiment of the present application. As shown in FIG. 8, the display panel further includes at least one second data signal line 125 connected to a column of second pixel circuits 124 to provide a data signal for the column of second pixel circuits 124.

In some embodiments, each second pixel circuit 124 includes a second data signal input terminal. When the second scan signal provided by the second scan signal input terminal of the second pixel circuit 124 is the effective level, the data signal provided by the second data signal line 125 is written into the second pixel circuit 124 via the second data signal input terminal. In the light emission stage, the second pixel circuit 124 drives, according to the data signal, the second display unit 111 to emit light. When the second pixel circuit 124 includes multiple sub-pixel-circuits, each column of sub-pixel-circuits correspond to one second data signal line 125 separately so that different data signals can be written into different sub-pixel-circuits.

With continued reference to FIG. 8, part of the at least one second data signal line 125 also serves as at least one first data signal line 122 in a time-division manner.

In some embodiments, when the display panel includes multiple columns of first pixel circuits 132, the first pixel circuit 132 may be disposed in the same column as the second pixel circuit 124. For example, when the first pixel circuits 132 are disposed in 16 columns and each first pixel circuit 132 includes three sub-pixel-circuits, 48 first data signal lines 122 are required. In this case, 48 second data signal lines 125 may also serve as the first data signal lines 122, where the 48 second data signal lines 125 are connected to each column of sub-pixel-circuits separately to provide the data signals for each column of sub-pixel-circuits. For example, when a first column of sub-pixel-circuits are connected to a q-th second data signal line 125, the q-th second data signal line 125 to a (q+47)-th second data signal line 125 may be sequentially connected to 48 columns of sub-pixel-circuits separately. In a driving process of the display panel, the effective level of the first scan signal is ahead of the effective level of the second scan signal. When the first scan signal provided from the first scan signal input terminal of the first pixel circuit 132 is the effective level, the second data signal lines 125 also serving as the first data signal lines provide the data signals corresponding to the first display units 111; and in the light emission stage, the first pixel circuit 132 drives, according to the data signal corresponding to the first display unit 111, the first display unit 111 to emit light. When the second scan signal provided by the second scan signal input terminal of the second pixel circuit 124 is effective level, the second data signal line 125 also serving as the first data signal line provides the data signal corresponding to the second display unit 123, and in the light emission stage, the second pixel circuit 124 drives, according to the data signal corresponding to the second display unit 123, the second display unit 123 to emit light. Thus, it may be implemented that when the second data signal line 125 also serves as the first data signal line, the first display unit 111 and the second display unit 123 emit light normally. In the preceding process, the data signals on the second data signal line 125 also serving as the first data signal line in different stages may be converted by a driver chip in the display panel, and the data signals can be transmitted by the driver chip to the second data signal line 125 also serving as the first data signal line.

Figure 9:
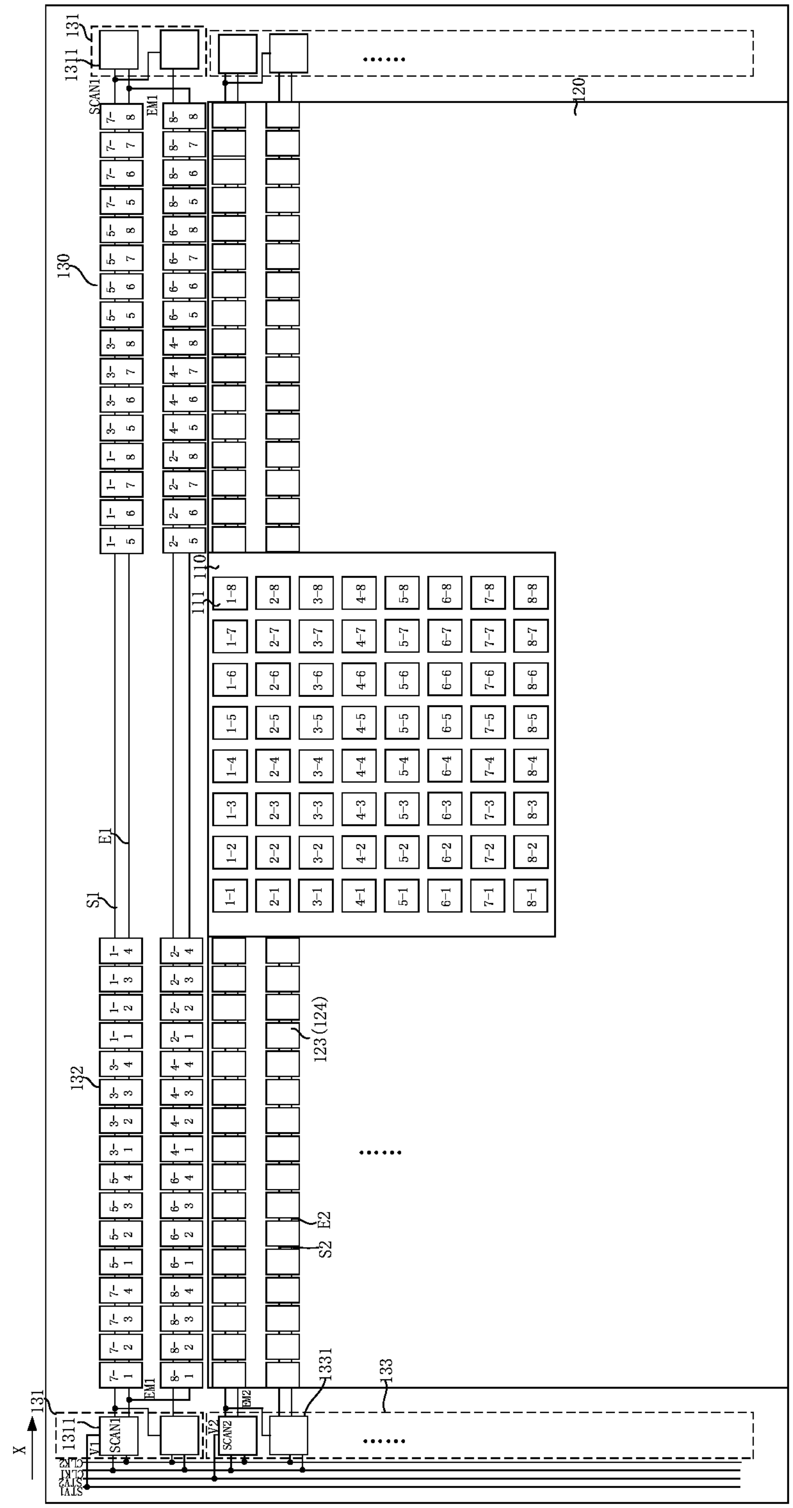
FIG. 9 is another schematic diagram of a display panel according to an embodiment of the present application.

FIG. 9 is another schematic diagram of a display panel according to an embodiment of the present application. As shown in FIG. 9, the display panel further includes at least one first clock signal line CLK1, at least one second clock signal line CLK2, at least one first start signal line STV1, and at least one second start signal line STV2; and the first start signal input terminal V1 of the first gate drive circuit 131 is connected to the first start signal line STV1, the second start signal input terminal V2 of the second gate drive circuit 133 is connected to the second start signal line STV2, the first clock signal input terminal of the first gate drive circuit 131 and the third clock signal input terminal of the second gate drive circuit 133 are connected to the first clock signal line CLK1, and the second clock signal input terminal of the first gate drive circuit 131 and the fourth clock signal input terminal of the second gate drive circuit 133 are connected to the second clock signal line CLK2.

In some embodiments, the first clock signal provided by the first clock signal line CLK1 and the second clock signal provided by the second clock signal line CLK2 are signals of opposite levels, that is, a phase of the first clock signal and a phase of the second clock signal are opposite to each other. When the first gate drive circuit 131 includes the cascaded first gate driving units, a first signal input terminal of an odd-th first gate driving unit and a second signal input terminal of an even-th first gate driving unit as first clock signal input terminals of the first gate drive circuit 131 are connected to the first clock signal line CLK1, and a second signal input terminal of the odd-th first gate driving unit and a first signal input terminal of the even-th first gate driving unit as second clock signal input terminals of the first gate drive circuit 131 are connected to the second clock signal line CLK2. Similarly, when the second gate drive circuit 133 includes the cascaded second gate driving units, a first signal input terminal of an odd-th second gate driving unit and a second signal input terminal of an even-th second gate driving unit as third clock signal input terminals of the second gate drive circuit 133 are connected to the first clock signal line CLK1, and a second signal input terminal of the odd-th second gate driving unit and a first signal input terminal of the even-th second gate driving unit as fourth clock signal input terminals of the second gate drive circuit 133 are connected to the second clock signal line CLK2. The first gate drive circuit 131 and the second gate drive circuit 133 share the first clock signal line CLK1 and the second clock signal line CLK2 so that signal lines on the display panel can be reduced, which is conducive to arranging the signal lines on the display panel and reducing the manufacturing difficulty of the display panel.

Figure 10:
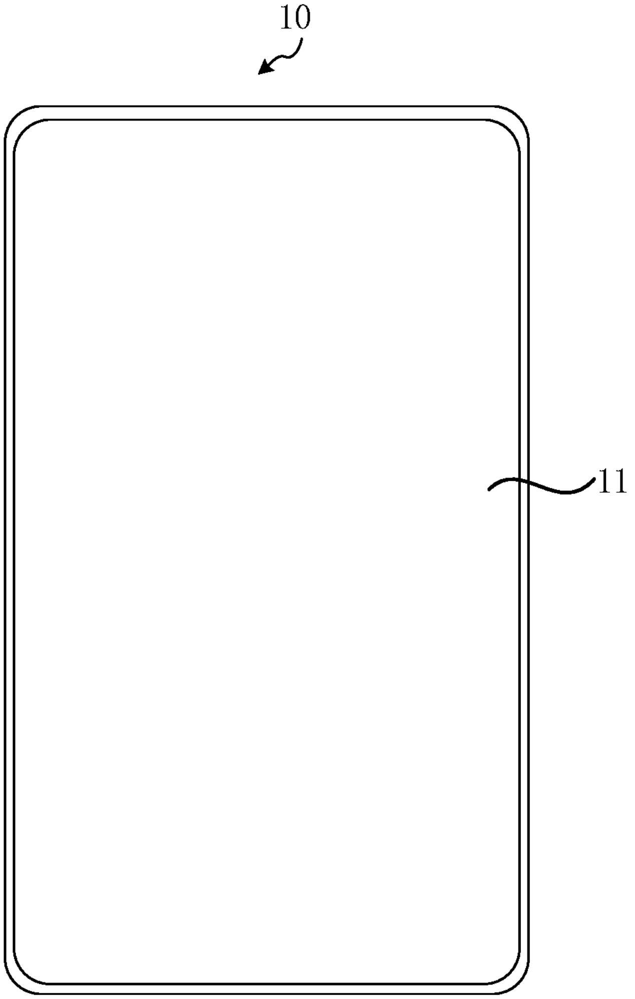
FIG. 10 is a schematic diagram of a display device according to an embodiment of the present application.

Embodiments of the present application further provide a display device. FIG. 10 is a schematic diagram of a display device according to an embodiment of the present application. As shown in FIG. 10, the display device 10 includes the display panel 11 provided in any embodiment of the present application.

What is claimed is:

1. A display panel, comprising:

a first display region, a second display region, and a non-display region, wherein transmittance of the first display region is higher than transmittance of the second display region;

at least one first display unit disposed in the first display region;

at least one first pixel circuit disposed in the non-display region, wherein the at least one first pixel circuit is connected to the at least one first display unit and configured to provide a drive current for the at least one first display unit;

a first scan signal line;

a first light emission control signal line; and at least one first gate drive circuit disposed in the non-display region, wherein the at least one first gate drive circuit is connected to the at least one first pixel circuit and configured to provide a drive signal for the at least one first pixel circuit, wherein each of the at least one first pixel circuit comprises a first scan signal input terminal and a first light emission control signal input terminal configured to receive signals from the at least one first gate drive circuit and configured to control provision of the drive current for the at least one first display unit, the at least one first pixel circuit comprises n rows of first pixel circuits, the at least one first gate drive circuit comprises n first gate driving units which are cascaded, each first gate driving unit comprises a first scan signal output terminal and a first light emission control signal output terminal, the first scan signal output terminal of each first gate driving unit is connected to a plurality of first scan signal input terminals of a respective row of first pixel circuits via the first scan signal line to provide a first scan signal for the respective row of first pixel circuits, the first light emission control signal output terminal of each first gate driving unit is connected to a plurality of first light emission control signal input terminals of at least one respective row of first pixel circuits via the first light emission control signal line to provide a first light emission control signal for the at least one respective row of first pixel circuits, n is an integer greater than or equal to 1, and the first gate drive circuits are disposed on two sides of the display panel along the row direction to drive the at least one first pixel circuit from two sides.

2. The display panel according to claim 1, wherein the at least one first display unit comprises a plurality of first display units, the at least one first pixel circuit comprises a plurality of first pixel circuits, and the plurality of first display units are correspondingly connected to the plurality of first pixel circuits via a plurality of transparent conductive lines.

3. The display panel according to claim 1, wherein each first gate driving unit further comprises a start signal input terminal, the first scan signal output terminal of an i-th first gate driving unit is connected to the start signal input terminal of an (i+1)-th first gate driving unit, and the (i+1)-th first gate driving unit is started by the first scan signal output by the i-th first gate driving unit, to enable the n first gate driving units to be cascaded, wherein i is an integer greater than or equal to 1 and less than or equal to n−1.

4. The display panel according to claim 1, further comprising:

at least one first data signal line, wherein each first data signal line is connected to a column of first pixel circuits to provide a data signal for the column of first pixel circuits.

5. The display panel according to claim 4, further comprising:

at least one second display unit disposed in the second display region;

at least one second pixel circuit disposed in the second display region; and at least one second gate drive circuit disposed in the non-display region, wherein the at least one second pixel circuit is connected to the at least one second display unit and configured to provide a drive current for the at least one second display unit, and the at least one second gate drive circuit is connected to the at least one second pixel circuit and configured to provide a drive signal for the at least one second pixel circuit.

6. The display panel according to claim 5, further comprising:

at least one second scan signal line; and at least one second light emission control signal line, wherein the at least one second pixel circuit comprises m rows of second pixel circuits and each second gate drive circuit comprises m second gate driving units which are cascaded, wherein each second gate driving unit comprises a second scan signal output terminal and a second light emission control signal output terminal, and each second pixel circuit comprises a second scan signal input terminal and a second light emission control signal input terminal;

the second scan signal output terminal of each second gate driving unit is connected to second scan signal input terminals of a respective row of second pixel circuits via the second scan signal line to provide a second scan signal for the respective row of second pixel circuits; and the second light emission control signal output terminal of each second gate driving unit is connected to second light emission control signal input terminals of at least one respective row of second pixel circuits via the second light emission control signal line to provide a second light emission control signal for the at least one respective row of second pixel circuits; and wherein a timing of an effective level of the first scan signal is ahead of a timing of an effective level of the second scan signal, and m is an integer greater than or equal to 1.

7. The display panel according to claim 6, wherein each second gate driving unit further comprises a start signal input terminal, the second scan signal output terminal of an i-th second gate driving unit is connected to the start signal input terminal of an (i+1)-th second gate driving unit, and the (i+1)-th second gate driving unit is started by the second scan signal output by the i-th second gate driving unit to enable the m second gate driving units to be cascaded, wherein i is an integer greater than or equal to 1 and less than or equal to m−1.

8. The display panel according to claim 5, further comprising:

at least one second data signal line, wherein each second data signal line is connected to a column of second pixel circuits to provide a data signal for the column of second pixel circuits.

9. The display panel according to claim 8, wherein part of the at least one second data signal line also serves as the at least one first data signal line in a time-division manner.

10. The display panel according to claim 6, further comprising:

at least one first clock signal line;

at least one second clock signal line;

at least one first start signal line; and at least one second start signal line, wherein each first gate drive circuit comprises a first start signal input terminal, a first clock signal input terminal, and a second clock signal input terminal, and each second gate drive circuit comprises a second start signal input terminal, a third clock signal input terminal, and a fourth clock signal input terminal, the first start signal input terminal of each first gate drive circuit is connected to the first start signal line, the second start signal input terminal of each second gate drive circuit is connected to the second start signal line, the first clock signal input terminal of each first gate drive circuit and the third clock signal input terminal of each second gate drive circuit are connected to the first clock signal line, and the second clock signal input terminal of each first gate drive circuit and the fourth clock signal input terminal of each second gate drive circuit are connected to the second clock signal line.

11. The display panel according to claim 1, wherein the at least one first gate drive circuit is disposed on one or two sides of the display panel along a row direction.

12. The display panel according to claim 5, wherein each second display unit comprises at least one light-emitting element, and each second pixel circuit comprises at least one sub-pixel-circuit, and wherein each light-emitting element is correspondingly connected to each sub-pixel-circuit.

13. The display panel according to claim 5, wherein the at least one second gate drive circuit is disposed on one or two sides of the display panel along a row direction.

14. The display panel according to claim 1, wherein the first light emission control signal for each row of the first pixel circuits is effective on a row by row basis.

15. The display panel according to claim 6, wherein the second light emission control signal for each row of the second pixel circuits is effective on a row by row basis.

16. The display panel according to claim 8, wherein the at least one first pixel circuit and the at least one second pixel circuit are disposed in a same column.

17. The display panel according to claim 10, wherein the first clock signal provided by each first clock signal line and the second clock signal provided by each second clock signal line are signals of opposite levels.

18. The display panel according to claim 1, wherein the first pixel circuits in two rows are disposed in the non-display region, and the first gate drive circuit includes two first gate driving units, where the first light emission control signal output terminal of the first one of the two first gate driving units is connected to the first light emission control signal input terminals of the first pixel circuits in the first row and the first light emission control signal input terminals of the first pixel circuits in the second row to provide the light emission control signal for the first pixel circuits in the two rows.

19. A display panel, comprising:

a first display region, wherein at least one first display unit is disposed in the first display region;

a second display region, wherein a transmittance of the first display region is higher than a transmittance of the second display region and a non-display region;

at least one first pixel circuit, wherein the at least one first pixel circuit is connected to the at least one first display unit and configured to provide a drive current for the at least one first display unit;

a first scan signal line;

a first light emission control signal line; and at least one first gate drive circuit disposed in the non-display region, wherein the at least one first gate drive circuit is connected to the at least one first pixel circuit and configured to provide a drive signal for the at least one first pixel circuit, wherein each of the at least one first pixel circuit comprises a first scan signal input terminal and a first light emission control signal input terminal configured to receive signals from the at least one first gate drive circuit and configured to control provision of the drive current for the at least one first display unit, the at least one first pixel circuit comprises n rows of first pixel circuits, the at least one first gate drive circuit comprises n first gate driving units which are cascaded, each first gate driving unit comprises a first scan signal output terminal and a first light emission control signal output terminal, the first scan signal output terminal of each first gate driving unit is connected to a plurality of first scan signal input terminals of a respective row of first pixel circuits via the first scan signal line to provide a first scan signal for the respective row of first pixel circuits, the first light emission control signal output terminal of each first gate driving unit is connected to a plurality of first light emission control signal input terminals of at least one respective row of first pixel circuits via the first light emission control signal line to provide a first light emission control signal for the at least one respective row of first pixel circuits, n is an integer greater than or equal to 1, and the first gate drive circuits are disposed on two sides of the display panel along the row direction to drive the at least one first pixel circuit from two sides.

20. The display panel according to claim 19, wherein the first pixel circuits in two rows are disposed in the non-display region, and the first gate drive circuit includes two first gate driving units, where the first light emission control signal output terminal of the first one of the two first gate driving units is connected to the first light emission control signal input terminals of the first pixel circuits in the first row and the first light emission control signal input terminals of the first pixel circuits in the second row to provide the light emission control signal for the first pixel circuits in the two rows.

* * * * *